United States Patent [19]

Hepburn

[11] Patent Number: 4,989,776

[45] Date of Patent: Feb. 5, 1991

[54] METHOD OF BRAZING ARTICLES CONTAINING ALUMINUM

[75] Inventor: William D. Hepburn, Edinburgh, Scotland

[73] Assignee: GEC Ferranti Defence Systems Limited, Stanmore, England

[21] Appl. No.: 386,119

[22] Filed: Jul. 28, 1989

[30] Foreign Application Priority Data

Aug. 4, 1988 [GB] United Kingdom ................. 8818541

[51] Int. Cl.⁵ ........................ B23K 35/00; B23K 35/26
[52] U.S. Cl. .................................... 228/118; 228/209; 228/218; 228/221; 228/263.17
[58] Field of Search ............... 228/118, 215, 183, 206, 228/209, 211, 218, 221, 263.17

[56] References Cited

U.S. PATENT DOCUMENTS

| | | | |
|---|---|---|---|
| 2,873,216 | 2/1959 | Schnable | 228/209 |
| 2,995,814 | 8/1961 | Chamness | 228/209 |
| 3,061,527 | 10/1962 | Karner et al. | 228/209 |
| 3,251,128 | 5/1966 | Ohno | 228/214 |
| 3,393,447 | 7/1968 | Paul | 228/209 |
| 3,909,209 | 9/1975 | Kruper et al. | 228/209 |
| 4,023,251 | 5/1977 | Darrow | 228/118 |
| 4,702,969 | 10/1987 | Bunkoczy et al. | 228/209 |
| 4,842,185 | 6/1989 | Kudo et al. | 228/263.17 |
| 4,848,646 | 7/1989 | Morishita et al. | 228/206 |
| 4,875,619 | 10/1989 | Anderson et al. | 228/206 |

FOREIGN PATENT DOCUMENTS

| | | | |
|---|---|---|---|
| 0206521 | 12/1986 | European Pat. Off. | |
| 5487 | 1/1977 | Japan | 228/209 |
| 215266 | 12/1984 | Japan | 228/183 |
| 825317 | 12/1959 | United Kingdom | |
| 1421958 | 1/1976 | United Kingdom | 228/263.17 |

*Primary Examiner*—Sam Heinrich
*Attorney, Agent, or Firm*—Kerkam, Stowell, Kondracki & Clarke

[57] ABSTRACT

Articles of aluminum, or of an aluminum alloy, can be brazed satisfactorily, employing an aluminum alloy as the brazing material, by removing any surface oxide layers from bodies comprising the articles, and preforms of the brazing material, simultaneously with providing initial films of zinc, or tin, thereon. Then coatings of silver and/or of gold, or a suitable alloy containing silver or gold, are provided on the articles, and on the preforms of the brazing material, to protect the surfaces of these aluminum containing bodies from reoxidizing. The required brazing operation then is performed in a high vacuum, or in an inert atmosphere. Any oxygen produced inadvertently, for example, by the decomposition of any silver oxide present, is removed before it can contact any aluminum. The zinc or tin, the materials of the coatings, and the aluminum of the bodies, interdiffuse, and this interdiffusion proceeds rapidly when the brazing alloy melts. Upon cooling the assembly, a metallurgically strong bond is provided between the brazed articles.

17 Claims, No Drawings

4,989,776

METHOD OF BRAZING ARTICLES CONTAINING ALUMINUM

BACKGROUND OF THE INVENTION

1. Field of the Invention

This invention relates to a method of brazing articles containing aluminum. The articles may comprise aluminum, or an alloy containing aluminum as the major constituent. The brazing material comprises an alloy containing aluminum, and having a melting temperature lower than the melting temperature of the material, or materials, of the articles to be brazed to each other.

DESCRIPTION OF THE PRIOR ART

The brazing of articles containing aluminum is rendered difficult because the articles, and the brazing alloy, inevitably have an aluminum oxide surface layer, which has to be removed before satisfactory brazing can occur. Such an oxide layer forms quickly on the surface of an aluminum containing article in, say, air, at ambient temperatures. Further, the aluminum oxide layers are chemically very stable, and are not easily removed. It is essential that the oxide layers are removed before brazing occurs, to enable the brazing alloy, when molten, to wet the surfaces of the articles.

It is possible to remove the surface oxide layers on bodies containing aluminum, the bodies comprising the articles to be brazed, and preforms of a brazing alloy, by chemical treatment of the surfaces. However, usually the surface oxide layers reform before, or during, the brazing operation, even if the brazing operation is performed in a high vacuum, or an inert atmosphere. This is because, inevitably, the article surfaces, and the surfaces of the brazing alloy preforms, are contacted by oxygen. Possibly such oxygen is released in an uncontrolled manner in the chamber in which the high vacuum, or the inert atmosphere, is provided. Hence, it is not usual to braze aluminum containing articles in a high vacuum, or an inert atmosphere.

One conventional way of removing the surface oxide layers on bodies comprising aluminum containing articles to be brazed, and preforms of the brazing alloy, is to heat the bodies in a molten salt bath, containing a constituent which removes the surface oxide layers, without attacking the materials of the bodies. Thus, in the molten salt bath, clean, unoxidised article surfaces are provided, clean unoxidised brazing alloy is capable of wetting these articles, and the articles can be brazed satisfactorily therein. However, when the brazed articles are removed from the molten salt bath, it is necessary to remove any salt adhering to the articles, otherwise, subsequently, undesirable corrosion of the articles will occur. With some article shapes, for example, when the articles have a hollow form, it is difficult, if not impossible, to remove all the salt.

Although not specifically related to brazing but to the analogous process of soldering, it is also known, as described in British Patent Specification No. 825,317, to solder articles containing aluminum by cleaning the surfaces in an aqueous zinc solution floating on a molten solder bath, the solution forming a zinc deposit on the oxide-free surface of the article before it is submerged through the interface into the solder, thereby avoiding contaminating contact with the atmosphere. Although not directly applicable to brazing this demonstrates also the lengths gone to hitherto to ensure proper wetting of aluminum surfaces to be joined by liquid metal alloy.

SUMMARY OF THE INVENTION

It is an object of the present invention to provide a novel and advantageous method of satisfactorily brazing articles containing aluminum, which method obviates the need of performing the brazing operation in a liquid environment, such as a molten salt bath to preclude oxygen contamination.

DESCRIPTION OF THE INVENTION

According to the present invention a method of brazing articles containing aluminum with a preform of an aluminum-containing brazing alloy, comprises covering the article surfaces, and the surfaces of the preform of brazing alloy, each initially with a film of zinc or tin, and with the inevitable aluminum oxide surface layer thereby removed, then providing a coating of silver and/or of gold, or a suitable alloy containing silver or gold, and subsequently the coated articles are brazed, either in a high vacuum, or in an inert atmosphere.

The materials of the coatings, and of the initial films, on the bodies comprising the articles and the preform, and the aluminum of the bodies, interdiffuse, and, during the brazing operation, this interdiffusion proceeds rapidly when the brazing alloy melts. Subsequently, a strong metallurgical bond is provided between the aluminum containing articles. Materials of the coatings, and of the initial films, are absorbed readily in molten aluminum, and do not prevent the aluminum to the brazing alloy coming into contact with the aluminum of the articles.

Zinc or tin is deposited upon the bodies, and simultaneously the aluminum oxide layers are removed from the bodies, by immersing the bodies in the appropriate solution.

The provided zinc or tin initial films, and the coatings, are as thin as may be obtained in a practical manner, and commensurate with it being ensured that substantially none of the aluminum becomes exposed under normally expected storage conditions, before the brazing operation.

The flow of the molten brazing alloy over the parts of the article surfaces to be brazed further ensures that no oxide layer is present in the brazing regions.

It is possible to coat articles containing aluminum, and a preform of an aluminum containing brazing alloy, initially covered with a film of zinc or tin, with a coating of a suitable alloy containing silver and/or gold, before any surface oxide layers form thereon. The coatings protect the article surfaces, and the surfaces of the preform of the brazing alloy, from reoxidation. The coatings either normally do not oxidise; or it any oxide of the coating material is formed, this decomposes at a temperature lower than the brazing temperature of the articles, and any oxygen so formed easily can be removed before contacting any aluminum. In order to remove any oxygen which may be formed, or is otherwise present during the brazing operation, the brazing operation is performed in a chamber in which a high vacuum, or an inert atmosphere, is provided. Any oxygen inadvertently present in such a chamber, at least substantially, can be removed before any aluminum is exposed. Any exposure of aluminum occurs only immediately before the required brazing temperature is obtained, and not while the articles, and the brazing alloy preform, are being brought up to the melting point of the brazing alloy.

The present invention will now be described with reference to the following Examples.

EXAMPLE 1

Articles to be brazed, and containing aluminum, are degreased. Similarly a preform of a brazing alloy, also containing aluminum, is degreased. The inevitable surface films of aluminum oxide are removed, and, simultaneously therewith, there are deposited films of zinc, 1 micron thick, on the articles, and on the perform of brazing alloy, by immersing the articles, and the preform, in sodium zincate solution. Before surface oxide layers can form on such covered bodies, the article surfaces, and the preform, are coated with silver, 2.5 microns thick, and by employing a conventional electroplating process step.

After being coated with silver, the surfaces of the aluminum containing articles to be brazed, and the surfaces of the aluminum containing brazing alloy preform, are protected from oxidation under storage conditions normally expected to be encountered. Even though the silver layers are contacted by oxygen, normally they are not oxidised, but under certain conditions some silver oxide may be formed.

The coated articles, with the coated preform therebetween, are mounted in a steel jig, in the arrangement in which the articles are required to be brazed, and the assembly is placed in the chamber of a conventional vacuum furnace.

The chamber of the vacuum furnace is evacuated to have a pressure of $1 \times 10^{-2}$ newtons per square metre therein; and the assembly is heated.

At a temperature of, at most, 250° C., any silver oxide present decomposes, and oxygen is released.

The brazing alloy preform, coated with silver and zinc, melts at a temperature of 577° C., and wets the parts of the article surfaces to be brazed, further ensuring that no oxide layer is present in the brazing regions. In this condition, interdiffusion of the zinc, silver, and aluminum proceeds rapidly. Both zinc and silver are absorbed readily into molten aluminum, and do not prevent the aluminum of the brazing alloy coming into contact with the aluminum of the articles.

The assembly is subjected to a maximum temperature, during the brazing operation, less than the melting point of any of the articles to be brazed.

Brazing is completed when the assembly has been allowed to cool. A satisfactory metallurgical bond is obtained between the articles.

Any oxygen which is released into the chamber of the vacuum furnace as the assembly is brought up to the required brazing temperature, as a result of the decomposition of any silver oxide which is present, or otherwise, cannot contact any aluminum until the brazing alloy has melted, when, at least substantially, all such oxygen has been removed from the continuously evacuated chamber of the vacuum furnace.

Alternatively, the required brazing operation may be performed in a chamber through which an inert gas is arranged to flow, and in order to remove satisfactorily any oxygen which may be released in the brazing operation.

EXAMPLE 2

Example 1 is repeated, except that the articles, and the preform of the brazing alloy, are covered initially with a film of tin, instead of zinc. The inevitable surface films of aluminum oxide are removed, and, simultaneously therewith, there are deposited films of tin, 1 micron thick, on the articles, and on the preform of brazing alloy, by immersing the articles, and the preform, in sodium stanate solution. Tin is usually coated with a film of oxide, and this may be avoided by the silver coating being provided on the freshly deposited tin.

The silver coating may be provided in any convenient way, instead of being deposited by electroplating.

The coating material for the articles surfaces, and for the preform of brazing alloy, may comprise, instead of silver, gold; or an alloy of silver and gold; or a suitable alloy with silver, or gold, as the major constituent. Oxide films do not form on exposed gold.

It may not be essential to have the whole of the surfaces of the articles without oxide layers during the brazing operation. Oxidised surface parts of an article are not wetted by the brazing alloy when molten, and the oxidised article surface parts advantageously serve to tend to cause the molten brazing alloy to be restricted to only unoxidised article surface parts. Conveniently, initially, the surface oxide layers are removed from the whole of each article, and the whole of the article surfaces are covered with films of zinc or tin, and then with coatings of a suitable alloy containing silver and/or gold. A layer of photoresist material is then provided on the whole of the coating on each article, and the coating, and the zinc or tin film, on the articles are etched selectively, employing conventional photolithographic process steps, to leave the coating, and the zinc or tin film, only on the parts to be brazed of the article surfaces. Subsequently, the photoresist is removed from the coating remaining on the articles; and the exposed surface parts of the articles, not to be brazed, are permitted to become oxidised.

The brazed, aluminum containing, articles may be subjected to a conventional heat treatment step, to strengthen them.

The articles may comprise either aluminum, or an alloy containing aluminum as the major constituent.

I claim:

1. A method of brazing articles containing aluminum with a preform of an aluminum-containing brazing alloy comprising rendering the surfaces of the articles and the preform free of oxide, covering them with a film of metal compatible with the brazing alloy, said metal film also being compatible with said articles and noble metals, coating the films with a metal having a noble metal constituent to inhibit oxidation thereof and subsequently brazing the coated articles with the preform in an oxygen-free non-liquid environment.

2. A method as claimed in claim 1 in which said film metal compatible with the brazing alloy, articles and noble metals, is zinc.

3. A method as claimed in claim 1 in which said film metal compatible with the brazing alloy, articles and noble metals, is tin.

4. A method as claimed in claim 1 in which said coating metal having a noble metal constituent is gold.

5. A method as claimed in claim 1 in which said coating metal having a noble metal constituent is silver.

6. A method as claimed in claim 1 in which said coating metal having a noble metal constituent is an alloy containing gold.

7. A method as claimed in claim 1 in which said coating metal having a noble metal constituent is an alloy containing silver.

8. A method as claimed in claim 1 in which said coating metal having a noble metal constituent is an alloy containing silver and gold.

9. A method as claimed in claim 1 in which said oxygen-free non-liquid environment is a vacuum.

10. A method as claimed in claim 9 in which said vacuum is continuously applied to remove any oxygen contaminants released from the coating metal below brazing temperature.

11. A method as claimed in claim 1 in which said oxygen-free non liquid environment is an inert gas atmosphere.

12. A method as claimed in claim 1 in which said inert gas atmosphere is caused to flow to remove any oxygen contaminants released from the coating metal below brazing temperature.

13. A method as claimed in claim 1 comprising applying the coating of metal to each film by electroplating.

14. A method as claimed in claim 1 comprising providing a coated film on the whole surface of each article and selectively removing the film from parts of the surfaces of the articles not to be joined by the brazing alloy, thereby permitting said parts of the surfaces to become oxidised and take no part in the subsequent brazing.

15. A method as claimed in claim 14 comprising selectively removing the film by depositing a layer of photoresist material on the surface of each article photolithographically exposing the photoresist material to select the parts of the surfaces of articles not to be joined by brazing and etching the exposed parts of the surfaces to remove the film and/or coating. to permit brazing-inhibiting oxidation to form on the surfaces of the article parts.

16. A method as claimed in claim 1 comprising providing a coated film on the whole surface of each article and selectively removing the film coating from parts of the surfaces of the articles not to be joined by the brazing alloy, thereby permitting said parts of the surfaces to become oxidised and take no part in the subsequent brazing.

17. A method as claimed in claim 16 comprising selectively removing the film coating by depositing a layer of photoresist material on the surface of each article photolithographically exposing the photoresist material to select the parts of the surfaces of articles not to be joined by brazing and etching the exposed parts of the surfaces to remove the film and/or coating to permit brazing-inhibiting oxidation to form on the surfaces of the article parts.

* * * * *